(No Model.)
S. D. POOLE.
SPREADER ROD.
No. 528,236. Patented Oct. 30, 1894.
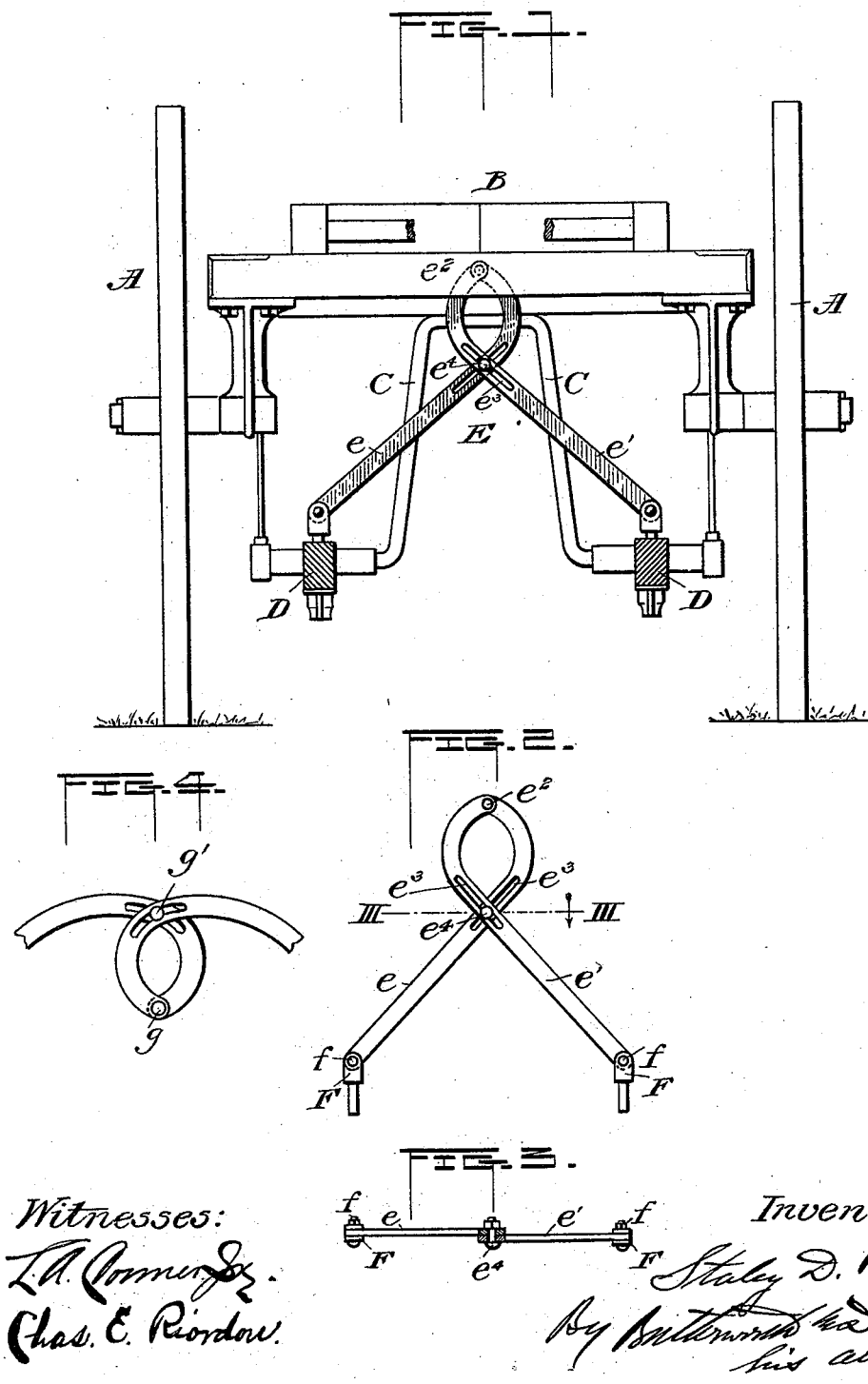

UNITED STATES PATENT OFFICE.

STALEY D. POOLE, OF MOLINE, ILLINOIS, ASSIGNOR TO THE DEERE & COMPANY, OF SAME PLACE.

SPREADER-ROD.

SPECIFICATION forming part of Letters Patent No. 528,236, dated October 30, 1894.

Application filed June 18, 1894. Serial No. 514,849. (No model.)

*To all whom it may concern:*

Be it known that I, STALEY D. POOLE, a citizen of the United States, residing at Moline, in the county of Rock Island and State of Illinois, have invented certain new and useful Improvements in Spreader-Rods; and I do hereby declare the following to be a full, clear, and exact description of the invention, such as will enable others skilled in the art to which it appertains to make and use the same.

This invention relates to spreader bars, but more particularly to such as are used for spreading the beams of wheeled cultivators. Heretofore it has been the practice to either provide an arched bar having a series of apertures in the opposite ends thereof adapted to be engaged by a bolt or other projection located on the beams and by which the said beams are adjusted to different widths; or a series of levers were provided requiring in each case the separate adjustment of each beam thereby consuming considerable time.

The primary object of my invention is to provide a simple and effective device whereby the beams may be spread apart the desired distance at the same time and by the same operation, or brought nearer together and locked in such positions.

A further object is to dispense with the necessity of disconnecting the ends of the bar from the beams.

The invention consists in the construction and combination of the parts as will be more fully hereinafter described and then defined in the claim at the end of the description.

Referring to the accompanying drawings, forming a part of this specification, Figure 1 is a rear end elevation partly in section of a cultivator with the spreading bar arranged in position for use. Fig. 2 is an elevation of the spreading bar removed from the machine, and having its ends drawn closer together. Fig. 3 is a sectional plan view on the line III—III of Fig. 2; and Fig. 4 illustrates a slightly modified form.

In the drawings A designates the wheels; B, a frame upon which the wheels are properly mounted; C, an arched rod secured to the frame, and D the cultivator beams. The beams D may be arranged in pairs, as shown, one at each side of the machine center and are pivotally and slidingly held at their forward ends to the arched rod C. This construction, however, is well-known and may be of any approved form, and further description thereof herein is not thought necessary.

The spreader bar E is preferably composed of two members $e$, $e'$, of a suitable length to have their inner ends overlapping and curved sufficiently to allow the same to be pivotally connected together at $e^2$. Where the two members overlap they are each provided with a slot $e^3$ extending at angles to each other and have a bolt $e^4$ passed through said slots for rigidly securing the two members together or to allow the said members to be adjusted. The outer ends of the members are pivotally connected to the beams D in any suitable manner, but preferably by means of bolts F secured to said beams D, each bolt having a forked end in which the outer end of each member of the spreader bar is pivotally secured by a pin or bolt $f$.

The operation of the device will be understood from the foregoing description. It will be seen that by loosening the bolt $e^4$ the two members may be moved on their pivots $e^2$, thereby causing the two beams to be spread apart or brought nearer together as desired, and then rigidly held in such position by tightening said bolt.

In Fig. 4 the members of the spreader bar have their pivotal point $g$ arranged below the adjusting point $g'$ instead of above the same, the two members being sufficiently curved to permit this.

I do not wish to confine myself to the exact construction shown, as I may make changes of substantially the same character without departing from the spirit of my invention.

Having thus fully described my invention, what I claim as new, and desire to secure by Letters Patent of the United States, is—

A spreader bar comprising two members which cross or overlap each other to form an adjusting point; the said members having their inner ends pivotally attached together, and provided with a slot in each member at the adjusting point, and a bolt passing through said slots for securing the two members in an adjusted position, substantially as described.

In testimony whereof I affix my signature in presence of two witnesses.

STALEY D. POOLE.

Witnesses:
A. R. EBI,
C. T. MOREY.